United States Patent [19]

Borgendale et al.

[11] Patent Number: 5,276,793
[45] Date of Patent: Jan. 4, 1994

[54] SYSTEM AND METHOD FOR EDITING A STRUCTURED DOCUMENT TO PRESERVE THE INTENDED APPEARANCE OF DOCUMENT ELEMENTS

[75] Inventors: Kenneth W. Borgendale; Darren J. Dobkin, both of Rockville, Md.

[73] Assignee: International Business Machines Corporation, Armonk, N.Y.

[21] Appl. No.: 523,082

[22] Filed: May 14, 1990

[51] Int. Cl.⁵ .............................................. G06F 15/62
[52] U.S. Cl. .................................... 395/148; 395/144; 395/161
[58] Field of Search ................. 395/144-149, 155, 161

[56] References Cited

U.S. PATENT DOCUMENTS

| | | | |
|---|---|---|---|
| 4,393,463 | 7/1983 | Aiken, Jr. | 364/900 |
| 4,454,576 | 6/1984 | McInroy et al. | 364/200 |
| 4,481,603 | 11/1984 | McCaskill et al. | 364/900 |
| 4,539,653 | 9/1985 | Bartlett et al. | 364/900 |
| 4,633,430 | 12/1986 | Cooper | 364/900 |
| 4,686,649 | 8/1987 | Rush et al. | 364/900 |
| 4,713,754 | 12/1987 | Agarwal et al. | 364/200 |
| 4,739,477 | 4/1988 | Barker et al. | 364/300 |

Primary Examiner—Heather R. Herndon
Attorney, Agent, or Firm—John E. Hoel

[57] ABSTRACT

A data processing system edits a text document stored as at least one alphanumeric string of structured document text and displayed as WYSIWYG (What You See Is What You Get) text. Look characteristics are controlled for a child document element of the text located within a parent document element of the text. The method performs the step of constructing a child resolved look data set necessary to specify a WYSIWYG appearance of the child element by first accessing modified look value customized by the user for first look parameters and accessing defined look values standardized for second look parameters. For those look parameters which are not customized by the user or which are not defined as standard values for the child element, the values are inherited by the child element from the parent element. To do this, the method performs the step of augmenting the child resolved look data set by accessing at least one of the plurality of look values in the parent resolved look data set which does not correspond to the first or the second look parameters. The resulting resolved look can completely specify the appearance of the child portion of the text when displayed in WYSIWYG form on a display, or when printed in hard copy.

16 Claims, 18 Drawing Sheets

FIG. 5

DEFINED ELEMENT LOOK TABLE 122

| NAME | LOOK PARAMETERS |
|---|---|
| ODOC | FONT TYPE = TIMES ROMAN<br>FONT SIZE = 10<br>ITALICS = N<br>BOLD FACE = N<br>BREAK = PAGE<br>SPACE BEFORE = 0<br>LEFT MARGIN = 0<br>RIGHT MARGIN = 0<br>... |
| PARAGRAPH | BREAK = LINE ; SPACE = 1ch |
| LIST | BREAK = LINE ; SPACE = 1ch ; PROC = LIST |
| LIST ITEM | BREAK = LINE ; SPACE = 1 ch; PROC = LIST |
| EXTRACT | BREAK = LINE ; SPACE = 1ch ; FONT = ITALIC 15<br>LMAR = 1.0i ; RMAR = 1.0i |
| BOLD FACE | FONT = BOLD |
| HEADING 1 | BREAK = PAGE |
| HEADING 2 | BREAK = PAGE |
| HEADING 3 | BREAK = LINE |
| TITLE | PROC = TITLE |
| Li01 | BREAK = LINE ; SPACE = 1ch ; LTEXT = ' / 1. |
| Li02 | BREAK = LINE ; SPACE = 1 ch ; LTEXT = ' / * / a. ; LMAR = .5i |
| TITLE 1 | FONT = BOLD HELVETICA 35 |
| TITLE 2 | FONT = BOLD HELVETICA 30 |
| TITLE 3 | FONT = BOLD HELVETICA 20 |

FIG. 5

DEFINED ELEMENT LOOK TABLE 122

| NAME | LOOK PARAMETERS |
|------|-----------------|
| ODOC | FONT TYPE = TIMES ROMAN<br>FONT SIZE = 10<br>ITALICS = N<br>BOLD FACE = N<br>BREAK = PAGE<br>SPACE BEFORE = 0<br>LEFT MARGIN = 0<br>RIGHT MARGIN = 0<br>... |
| PARAGRAPH | BREAK = LINE ; SPACE = 1ch |
| LIST | BREAK = LINE ; SPACE = 1ch ; PROC = LIST |
| LIST ITEM | BREAK = LINE ; SPACE = 1ch; PROC = LIST |
| EXTRACT | BREAK = LINE ; SPACE = 1ch ; FONT = ITALIC 15<br>LMAR = 1.0i ; RMAR = 1.0i |
| BOLD FACE | FONT = BOLD |
| HEADING 1 | BREAK = PAGE |
| HEADING 2 | BREAK = PAGE |
| HEADING 3 | BREAK = LINE |
| TITLE | PROC = TITLE |
| Li01 | BREAK = LINE ; SPACE = 1ch ; LTEXT = ' / 1. |
| Li02 | BREAK = LINE ; SPACE = 1 ch ; LTEXT = ' / * / a. ; LMAR = .5i |
| TITLE 1 | FONT = BOLD HELVETICA 35 |
| TITLE 2 | FONT = BOLD HELVETICA 30 |
| TITLE 3 | FONT = BOLD HELVETICA 20 |

FIG. 7

3001 → *Here is a long quote. It contains lots of words that someone said. Here is a long quote. It contains lots of words that someone said.*

*Here is a long quote. These words are especially important. It* — 3002

3003 → *contains lots of words that someone said. Here is a long quote. It contains lots of words that someone said. Here is a long quote. It contains lots of words that someone said*

DOWN HERE IS AN ORDINARY PARAGRAPH. IT IS NOT EMPHASIZED IN ANY WAY. THIS IS A NORMAL TIMES ROMAN FONT. ⟵ 3004

FIG. 8

```
< ODOC >                                    ← 1001
< EXTRACT >                                 ← 1002
HERE IS A LONG QUOTE. IT CONTAINS           ← 3001
LOTS OF WORDS THAT SOMEONE SAID.
HERE IS A LONG QUOTE. IT CONTAINS
LOTS OF WORDS THAT SOMEONE SAID.            ← 1003
HERE IS A LONG QUOTE. < b > THESE WORDS     ← 3002
ARE ESPECIALLY IMPORTANT. < /b > IT         ← 1004
CONTAINS LOTS OF WORDS THAT SOMEONE
SAID. HERE IS A LONG QUOTE. IT CONTAINS     ← 3003
LOTS OF WORDS THAT SOMEONE SAID. HERE
IS A LONG QUOTE. IT CONTAINS LOTS OF        ← 1005
WORDS THAT SOMEONE SAID. < EXTRACT >
< p >                                       ← 1006
DOWN HERE IS AN ORDINARY PARAGRAPH. IT IS NOT EMPHASIZED IN ANY
WAY. THIS IS A NORMAL TIMES ROMAN FONT. < /p >    ← 3004, 1007
< /ODOC >                                   ← 1008
```

FIG. 9

*Here is a long quote. It contains lots of words that someone said. Here is a long quote. It contains lots of words that someone said.* ← 3001

*Here is a long quote.* *These words are especially important.* *It* ← 3002

*contains lots of words that someone said. Here is a long quote. It contains lots of words that someone said. Here is a long quote. It contains lots of words that someone said* ← 3003

3005 → ← 3006

3006 → DOWN HERE IS AN ORDINARY PARAGRAPH. THESE WORDS ARE ESPECIALLY IMPORTANT. IT IS NOT EMPHASIZED IN ANY WAY. THIS IS A NORMAL TIMES ROMAN FONT.

```
          1001
         ↙
       1002
< ODOC >  ↙                          3001
< EXTRACT >                         ↙
HERE IS A LONG QUOTE. IT CONTAINS
LOTS OF WORDS THAT SOMEONE SAID.
HERE IS A LONG QUOTE. IT CONTAINS
LOTS OF WORDS THAT SOMEONE SAID.    ← 1003
HERE IS A LONG QUOTE. < b > THESE WORDS  ← 3002
ARE ESPECIALLY IMPORTANT. < / b > IT  ← 1004
CONTAINS LOTS OF WORDS THAT SOMEONE
SAID. HERE IS A LONG QUOTE. IT CONTAINS
LOTS OF WORDS THAT SOMEONE SAID. HERE  ← 3003
IS A LONG QUOTE. IT CONTAINS LOTS OF
WORDS THAT SOMEONE SAID. < / EXTRACT >  ← 1005
< p >                                     ← 1010
DOWN HERE IS AN ORDINARY PARAGRAPH. < b > THESE WORDS ARE ESPECIALLY
IMPORTANT. < /b > IT IS NOT EMPHASIZED IN ANY WAY. THIS IS A NORMAL TIMES
ROMAN FONT. < / p >   ← 1011
< / ODOC >
1013            1012
```

DOCUMENT STRUCTURE TABLE 124 (BEFORE COPY OPERATION)

| ADDRESS | ELEMENT TAG | PARENT ADDRESS | BEGIN ADDRESS | MODIFIED LOOK PTR | RESOLVED LOOK PTR | TEXT POINTER | NEXT ADDRESS |
|---|---|---|---|---|---|---|---|
| 1001 | ODOC | - | - | - | 2001 | - | 1002 |
| 1002 | EXTRACT | 1001 | - | - | 2002 | 3001 | 1003 |
| 1003 | BOLD | 1002 | - | - | 2003 | 3002 | 1004 |
| 1004 | /BOLD | - | 1003 | - | 2002 | 3003 | 1005 |
| 1005 | /EXTRCT | - | 1002 | - | 2001 | - | 1006 |
| 1006 | PARA | 1001 | - | - | 2004 | 3004 | 1007 |
| 1007 | /PARA | - | 1006 | - | 2001 | - | 1008 |
| 1008 | /ODOC | - | 1001 | - | - | - | - |

FIG. 14

STRING BUFFER 128 (BEFORE COPY OPERATION)

| ADDRESS | STRING |
|---|---|
| 3001 | "HERE IS A LONG QUOTE. IT CONTAINS LOTS OF WORDS THAT SOMEONE SAID. HERE IS A LONG QUOTE. IT CONTAINS LOTS OF WORDS THAT SOMEONE SAID. HERE IS A LONG QUOTE." |
| 3002 | " THESE WORDS ARE ESPECIALLY IMPORTANT. " |
| 3003 | " IT CONTAINS LOTS OF WORDS THAT SOMEONE SAID. HERE IS A LONG QUOTE. IT CONTAINS LOTS OF WORDS THAT SOMEONE SAID. HERE IS A LONG QUOTE. IT CONTAINS LOTS OF WORDS THAT SOMEONE SAID. " |
| 3004 | " DOWN HERE IS AN ORDINARY PARAGRAPH. IT IS NOT EMPHASIZED IN ANY WAY. THIS IS A NORMAL TIMES ROMAN FONT. " |

FIG. 13

RESOLVED LOOK TABLE 126 (BEFORE COPY OPERATION)

| RELATED ELEMENT | ADDRESS | PARAMETER VALUES | | CAN IT BE INHERITED |
|---|---|---|---|---|
| ODOC | 2001 | FONT | = TIMES ROMAN | Y |
| | | FONT SIZE | = 10 | Y |
| | | ITALICS | = N | Y |
| | | BOLD FACE | = N | Y |
| | | BREAK | = PAGE | N |
| | | SPACE BEFORE | = 0 | N |
| | | LEFT MARGIN | = 0 | Y |
| | | RIGHT MARGIN | = 0 | Y |
| | | ... | | |
| EXTRACT | 2002 | FONT TYPE | = TIMES ROMAN | Y |
| | | FONT SIZE | = 15 | Y |
| | | ITALICS | = Y | Y |
| | | BOLD FACE | = N | Y |
| | | BREAK | = LINE | N |
| | | SPACE BEFORE | = 1CH | N |
| | | LEFT MARGIN | = 1 | Y |
| | | RIGHT MARGIN | = 1 | Y |
| | | ... | | |
| BOLD (1003) | 2003 | FONT TYPE | = TIMES ROMAN | Y |
| | | FONT SIZE | = 15 | Y |
| | | ITALICS | = Y | Y |
| | | BOLD FACE | = Y | Y |
| | | BREAK | = N | N |
| | | SPACE BEFORE | = 0 | N |
| | | LEFT MARGIN | = 1 | Y |
| | | RIGHT MARGIN | = 1 | Y |
| | | ... | | |
| PARA | 2004 | FONT TYPE | = TIMES ROMAN | Y |
| | | FONT SIZE | = 10 | Y |
| | | ITALICS | = N | Y |
| | | BOLD FACE | = N | Y |
| | | BREAK | = LINE | N |
| | | SPACE BEFORE | = 1CH | N |
| | | LEFT MARGIN | = 0 | Y |
| | | RIGHT MARGIN | = 0 | Y |
| | | ... | | |

FIG. 16

DOCUMENT STRUCTURE TABLE 124 (AFTERCOPY OPERATION)

| ADDRESS | ELEMENT TAG | PARENT ADDRESS | BEGIN ADDRESS | MODIFIED LOOK PTR | RESOLVED LOOK PTR | TEXT POINTER | NEXT ADDRESS |
|---------|-------------|----------------|---------------|-------------------|-------------------|--------------|--------------|
| 1001 | ODOC | - | - | - | 2001 | - | 1002 |
| 1002 | EXTRACT | 1001 | - | - | 2002 | 3001 | 1003 |
| 1003 | BOLD | 1002 | - | - | 2003 | 3002 | 1004 |
| 1004 | /BOLD | - | 1003 | - | 2002 | 3003 | 1005 |
| 1005 | /EXTRACT | - | 1002 | - | 2001 | - | 1009 |
| 1009 | PARA | 1001 | - | - | 2004 | 3005 | 1010 |
| 1010 | BOLD | 1009 | - | - | 2005 | 3006 | 1011 |
| 1011 | /BOLD | - | 1010 | - | 2004 | 3007 | 1012 |
| 1012 | /PARA | - | 1009 | - | 2001 | - | 1013 |
| 1013 | /ODOC | - | 1001 | - | - | - | - |

FIG. 17

RESOLVED LOOK TABLE 126 (BEFORE COPY OPERATION)

| RELATED ELEMENT | ADDRESS | PARAMETER VALUES | | CAN IT BE INHERITED |
|---|---|---|---|---|
| ODOC | 2001 | FONT TYPE<br>FONT SIZE<br>ITALICS<br>BOLD FACE<br>BREAK<br>SPACE BEFORE<br>LEFT MARGIN<br>RIGHT MARGIN<br>... | = TIMES ROMAN<br>= 10<br>= N<br>= N<br>= PAGE<br>= 0<br>= 0<br>= 0 | Y<br>Y<br>Y<br>Y<br>N<br>N<br>Y<br>Y |
| EXTRACT | 2002 | FONT TYPE<br>FONT SIZE<br>ITALICS<br>BOLD FACE<br>BREAK<br>SPACE BEFORE<br>LEFT MARGIN<br>RIGHT MARGIN<br>... | = TIMES ROMAN<br>= 15<br>= Y<br>= N<br>= LINE<br>= 1CH<br>= 1<br>= 1 | Y<br>Y<br>Y<br>Y<br>N<br>N<br>Y<br>Y |
| BOLD (1003) | 2003 | FONT TYPE<br>FONT SIZE<br>ITALICS<br>BOLD FACE<br>BREAK<br>SPACE BEFORE<br>LEFT MARGIN<br>RIGHT MARGIN<br>... | = TIMES ROMAN<br>= 15<br>= Y<br>= Y<br>= N<br>= 0<br>= 1<br>= 1 | Y<br>Y<br>Y<br>Y<br>N<br>N<br>Y<br>Y |
| PARA | 2004 | FONT TYPE<br>FONT SIZE<br>ITALICS<br>BOLD FACE<br>BREAK<br>SPACE BEFORE<br>LEFT MARGIN<br>RIGHT MARGIN<br>... | = TIMES ROMAN<br>= 10<br>= N<br>= N<br>= LINE<br>= 1CH<br>= 0<br>= 0 | Y<br>Y<br>Y<br>Y<br>N<br>N<br>Y<br>Y |
| BOLD (1010) | 2005 | FONT TYPE<br>FONT SIZE<br>ITALICS<br>BOLD FACE<br>BREAK<br>SPACE BEFORE<br>LEFT MARGIN<br>RIGHT MARGIN<br>... | = TIMES ROMAN<br>= 10<br>= N<br>= Y<br>= N<br>= 0<br>= 0<br>= 0 | Y<br>Y<br>Y<br>Y<br>N<br>N<br>Y<br>Y |

FIG. 18

STRING BUFFER 128 (AFTER COPY OPERATION)

| ADDRESS | STRING |
|---|---|
| 3001 | "HERE IS A LONG QUOTE. IT CONTAINS LOTS OF WORDS THAT SOMEONE SAID. HERE IS A LONG QUOTE. IT CONTAINS LOTS OF WORDS THAT SOMEONE SAID. HERE IS A LONG QUOTE." |
| 3002 | "THESE WORDS ARE ESPECIALLY IMPORTANT." |
| 3003 | "IT CONTAINS LOTS OF WORDS THAT SOMEONE SAID. HERE IS ALONG QUOTE. IT CONTAINS LOTS OF WORDS THAT SOMEONE SAID HERE IS A LONG QUOTE. IT CONTAINS LOTS OF WORDS THAT SOMEONE SAID." |
| 3005 | "DOWN HERE IS AN ORDINARY PARAGRAPH." |
| 3006 | " THESE WORDS ARE ESPECIALLY IMPORTANT." |
| 3007 | "IT IS NOT EMPHASIZED IN ANY WAY. THIS IS A NORMAL TIMES ROMAN FONT" |

RESEARCH PAPER DOCUMENT CONSTRUCTION MODULE 111'

CORRESPONDENCE DOCUMENT CONSTRUCTION MODULE 111'

TECHNICAL WRITING DOCUMENT CONSTRUCTION MODULE 111'

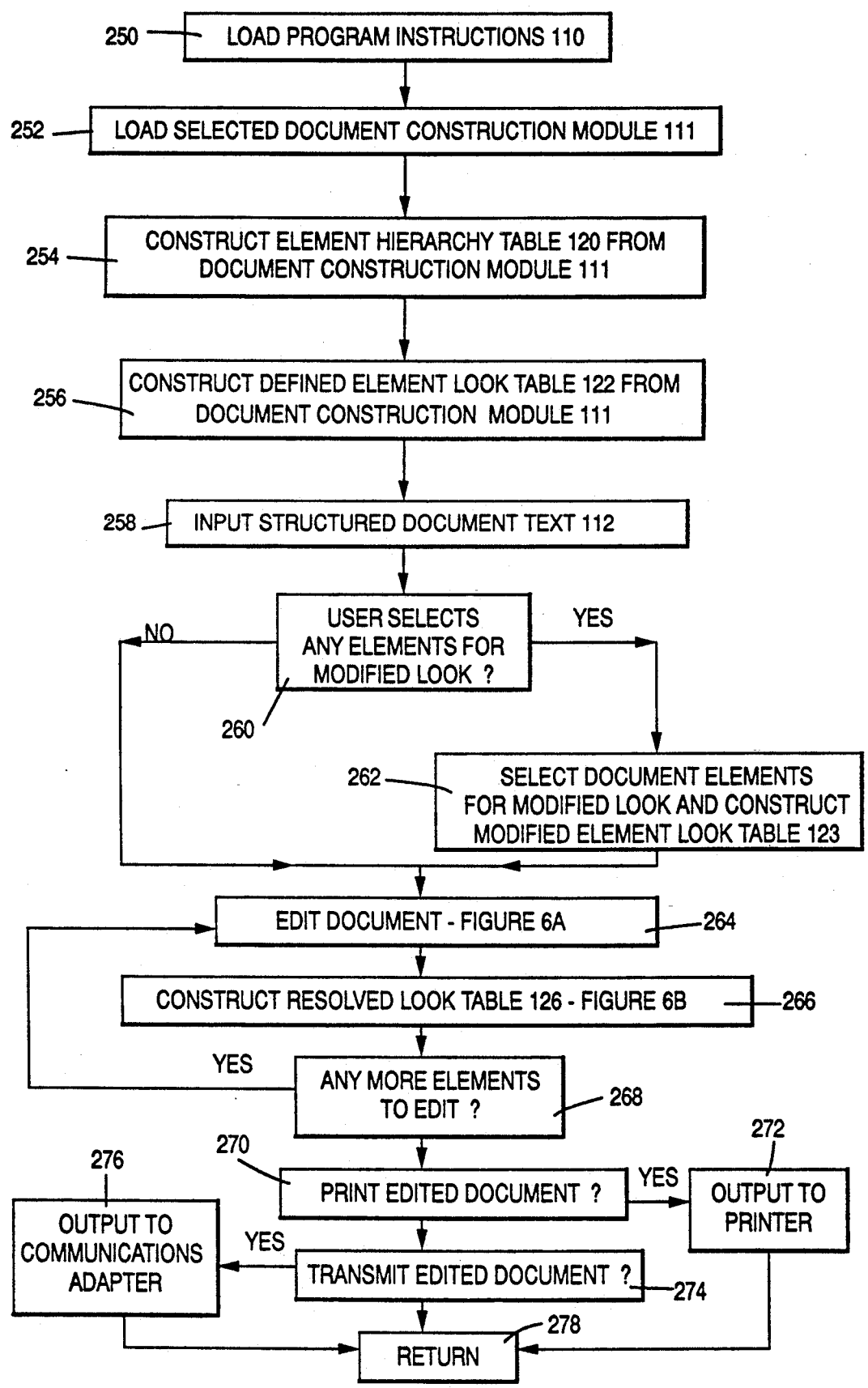

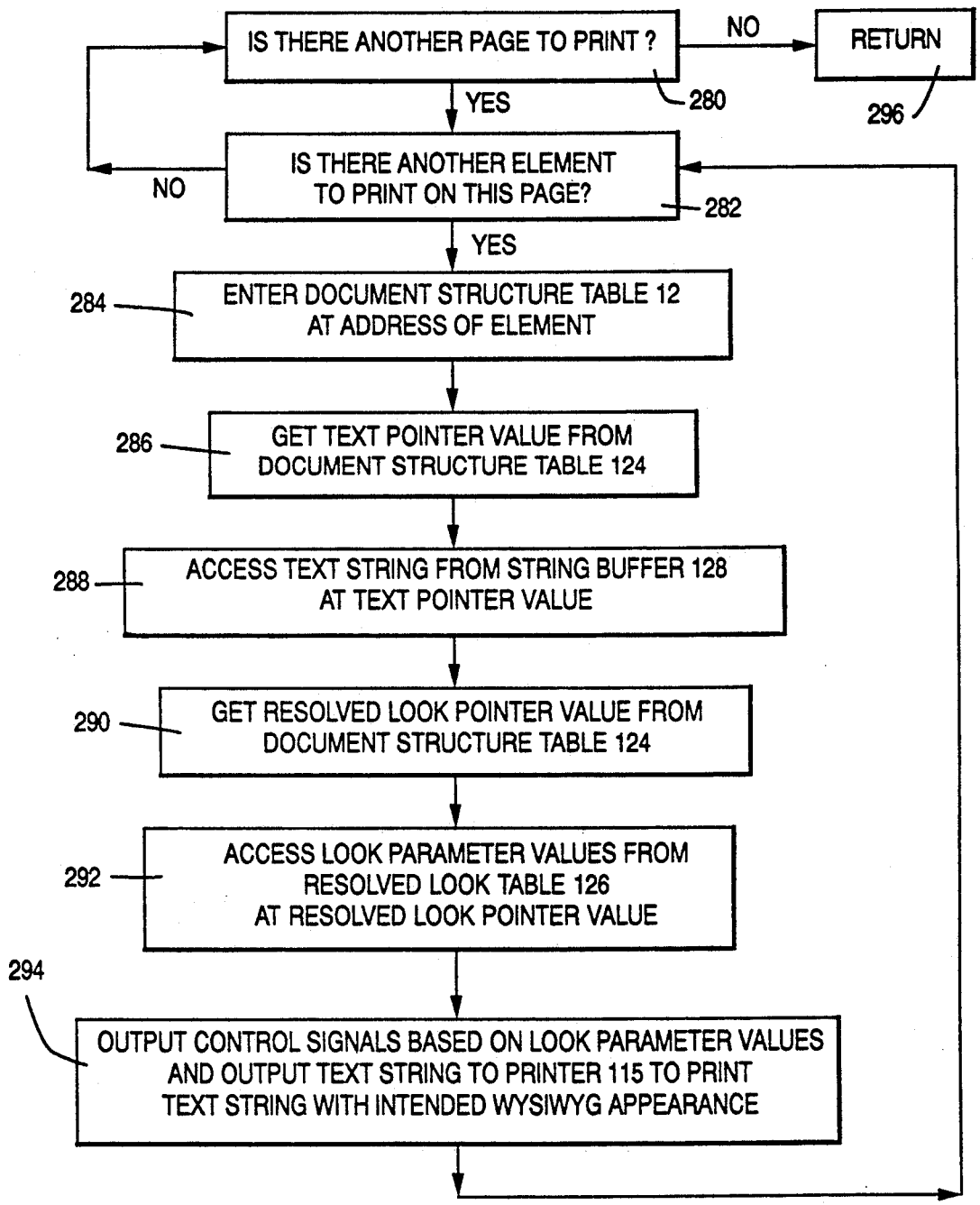

SYSTEM AND METHOD FOR EDITING A STRUCTURED DOCUMENT TO PRESERVE THE INTENDED APPEARANCE OF DOCUMENT ELEMENTS

BACKGROUND OF THE INVENTION

1. Technical Field

The invention disclosed broadly relates to electrical computers and data processing systems and more particularly relates to data processing systems and methods for editing structured document text.

2. Background Art

Modern word processing and text editing programs employ structured document architecture to provide greater control and flexibility in the displayed and printed appearance of documents prepared with the programs. Structured document architecture is described, for example, in the below referenced U.S. patent application by Bennett, et al. A structured document can be prepared in accordance with the Standardized General Markup Language, such as is described in the International Standards Organization, Standard 8879-1986. A data stream of text marked up in accordance with the Standardized General Markup Language, will have its text divided into elements consisting of a begin tag and its content and terminated by an end tag, when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include paragraphs, simple lists, ordered lists, bulleted lists, list items, headings, and document titles. A hierarchical structure can be attributed to these various elements, such as assigning the title element as having the highest level in a hierarchy, assigning a chapter heading as having a next highest level in the hierarchy, and assigning a paragraph element as having a third highest level in an example structured document hierarchy.

The appearance of a structured document text when it is displayed on a display screen or when it is printed in hard copy, should be in its WYSIWYG (What You See Is What You Get) form. In the prior art, editors and word processors have provided some specifications for the appearance of the WYSIWYG presentation of the text, for example the setting of margins, the specification of tabs, and the specification of fonts. Typically, prior art editors and word processors would impose the margin settings for the entire document and the font style for the entire document. Editors and word processors might provide for the insertion of bold face tags for designated portions of the text, however the association of the bold face tag with the text would be immutably fixed with respect to the particular designated text. An underline emphasis in the prior art was conducted in the same way, where a beginning mark and an ending mark for the underlined portion of the text was embedded into the text. If the text were moved or copied to another portion of the document, the bold face or underline emphasis would remain associated with the text, despite any intention on the part of the user to avoid carrying along the particular form of emphasis.

In the prior art there have been some examples of structured document architecture applied to editors and word processors. In such prior art editors and word processors, attempts have been made to control, to a limited degree, the WYSIWYG appearance of the text when it is displayed on a display screen or printed in hard copy. Typically, overall characteristics for a section of the text might have specified the margins, font and perhaps some forms of emphasis such as bold face and italic. If the user writes a sentence which he intends to be all in italic, with a first portion in italic, a middle portion combined bold face and italic, and an end portion being only italic, the prior art editors and word processors would consider this sentence to be composed of three separate alphanumeric strings, with the first string being separately specified as italic, the middle string being separately specified as both bold face and italic, and the third string being separately specified as italic. If the user, at a later stage in the editing session, wants to copy the middle section of the sentence to another portion of the document, when the user copies that section to another part of that document, it will appear in the new portion of the document in both the combined italic and bold face appearance. If the user had intended that the copied middle portion of the sentence no longer have the italicized characteristic but only the bold face characteristic in its copied new location, he would have failed in achieving his intentions since the prior art editor would have continued to provide the combined italicized and bold face appearance for the copied portion, notwithstanding the fact that it occupied a separate, non-italicized portion of the document. This occurred in the prior art because the prior art editors and word processors would not maintain the appearance characteristics of a document element on an individualized hierarchical level. This is just one example of many failings of the prior art in not reflecting the user's intention in editing structured documents.

RELATED PATENT APPLICATIONS

The following patent applications serve to describe the background of the invention and are incorporated herein by reference.

U.S. patent application Ser. No. 344,322 filed Apr. 26, 1989 by Bennett, et al. entitled "A Method for Manipulating Elements Within a Structured Document Using Active Intent Interpretation," assigned to the IBM Corporation and incorporated herein by reference, now abandoned.

U.S. patent application Ser. No. 344,342 filed Apr. 26, 1989 to Lim, et al. entitled "A Method for Copying a Marked Portion of a Structured Document," assigned to the IBM Corporation and incorporated herein by reference, now abandoned.

U.S. patent application Ser No. 344,343 filed Apr. 26, 1989 to Lim, et al. entitled "A Method for Deleting a Marked Portion of a Structured Document," assigned to the IBM Corporation and incorporated herein by reference, now U.S. Pat. No. 5,140,521.

U.S. patent application Ser. No. 516,373 filed Apr. 30, 1990 by Hesse, et al. entitled "A System and Method for Editing a Structured Document to Modify Emphasis Characteristics," assigned to the IBM Corporation and incorporated herein by reference, now abandoned.

OBJECTS OF THE INVENTION

It is therefore an object of the invention to provide an improved editing process for structured documents which more faithfully reflects the intention of the user.

It is a further object of the invention to provide a method for editing a structured document which more effectively preserves the intended appearance of document elements.

It is still a further object of the invention to provide a system and method for editing a structured document, which provides greater flexibility and control in designating the appearance of document elements.

SUMMARY OF THE INVENTION

These and other objects, features and advantages are accomplished by the invention disclosed herein. A data processing system is disclosed for editing a text document stored as at least one alphanumeric string of structured document text and displayed as WYSIWYG text. In accordance with the invention, a method and system are disclosed for controlling look characteristics of a child document element of the text located within a parent document element of the text.

The method includes the step of storing a modified look value for a first look parameter necessary to specify a WYSIWYG appearance of the child element. This enables the user to customize the look for specific portions of the text. For those portions of the text which the user intends to give a standard appearance, the method further includes storing a defined look value for a second look parameter necessary to specify a WYSIWYG appearance of the child element.

Then the method takes the step of storing a parent resolved look data set having a plurality of look values for a plurality of look parameters necessary to specify a WYSIWYG appearance of the parent element. This resolved look can completely specify the appearance of the parent portion of the text when displayed in WYSIWYG form on a display, or when printed in hard copy.

In accordance with the invention, the method performs the step of constructing a child resolved look data set by accessing the modified look value for the first look parameter and accessing the defined look value for said second look parameter. For those look parameters which are not customized by the user or which are not defined as standard values for the child element, the values can be inherited by the child element from the parent element. To do this, the method performs the step of augmenting the child resolved look data set by accessing at least one of the plurality of look values in the parent resolved look data set which does not correspond to the first or the second look parameters. This resolved look can completely specify the appearance of the child portion of the text when displayed in WYSIWYG form on a display, or when printed in hard copy.

If a look parameter is not a type which can be inherited, then a default value will be supplied.

The method then concludes with the step of displaying or printing a WYSIWYG appearance of the child element controlled by a combination of modified and defined look values for the child element and inherited look values for the parent element.

An additional feature of the invention is the provision of a document construction module which provides a document type definition and a base style for a particular kind of writing to be performed by the user. Different document construction module types can be provided for a research paper format, or a correspondence format, or a technical writing format, or other forms of writing. Each of these particular types of writing has its own characteristic format and organization which is characterized by the document type definition and base style contained in the document construction module. The user can selectively load different types of document construction modules, each type reflecting the user's intention for the format of the document. The document construction module will then provide the types of document elements and the hierarchy, and the defined element looks for the document.

BRIEF DESCRIPTION OF THE DRAWINGS

These and other objects, features and advantages of the invention will be more fully appreciated with reference to the accompanying figures.

FIG. 4 illustrates the element hierarchy table 120.

FIG. 5 illustrates the defined element look table 122.

FIG. 7 is a WYSIWYG representation of text before a copy function, for a working example.

FIG. 8 depicts the structured document tags for the text of FIG. 7.

FIG. 9 is the WYSIWYG representation of document text after a copying operation, for the working example.

FIG. 10 illustrates the structured document tags for the text of FIG. 9.

FIG. 12 illustrates the document structure table 124 corresponding to FIG. 11.

FIG. 13 illustrates the resolved look table 126, before the copy operation corresponding to FIG. 11.

FIG. 14 illustrates the string buffer 128 before the copy operation, corresponding to FIG. 11.

FIG. 16 illustrates the document structure table 124 after the copy operation, corresponding to FIG. 15.

FIG. 17 illustrates the resolved look table 126 after the copy operation, corresponding to FIG. 15.

FIG. 18 illustrates the string buffer 128 after the copy operation corresponding to FIG. 15.

FIG. 22 is a flow, diagram illustrating the overall operation of the invention starting with the loading of program instructions through the editing and printing or transmitting of the edited document.

FIG. 23 is a flow diagram of the process for printing.

DESCRIPTION OF THE BEST MODE FOR CARRYING OUT THE INVENTION

Figure 1:
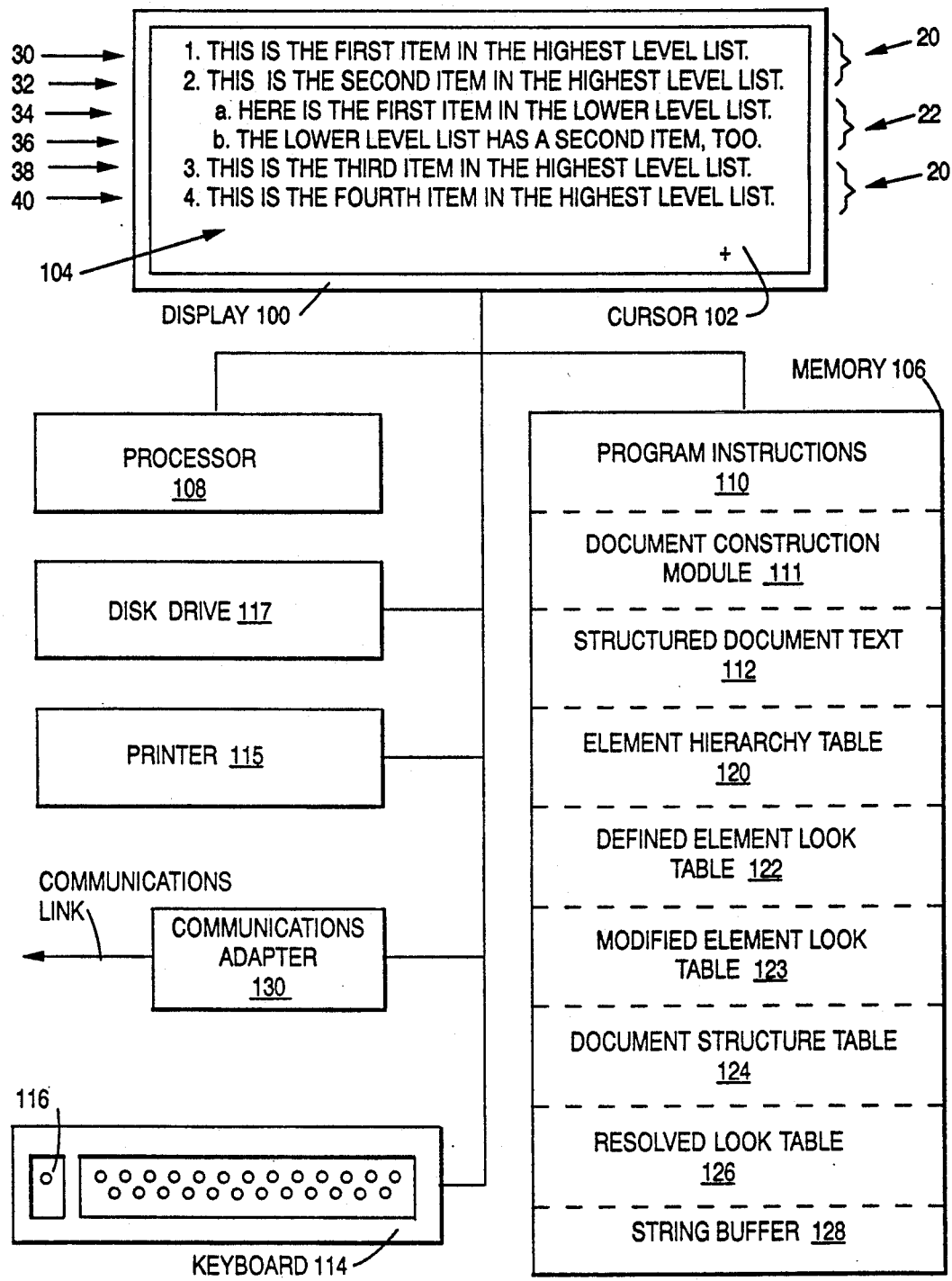
FIG. 1 is an overall architectural diagram of the system.

In order to more to more fully appreciate the features of the invention, a series of definitions will be provided as follows.

SGML

Standardized General Markup Language. A markup language consisting of tags used to prepare structured documents. Refer to International Standards Organization standard 8879-1986 for definition and details.

Structured document

A document prepared in accordance with an SGML-compliant type definition.

Element

SGML-defined entity consisting of a begin tag and its content, and including an end tag, when necessary.

Current document position

The document position which determines the focal point for an editing operation.

Current element

The innermost document element which contains the current document position. This refers to the lowest level child element within the element structure which contains the current document position. For example, in a document where the current document position exists within a List Item which is a child of a List within a Paragraph, the current element is known as the List Item (even though the document position is within all three elements), as it is the lowest level child element.

Marked Area

A marked area is an area of the document which has been selected by the user for special processing—the selected area is "highlighted" as a way to give visual feedback to the user during the selection process. Many functions may then be invoked upon that marked area including Delete (to delete the selected area from the document), Move and Copy (to move/copy the contents of the selected area to another location within the document) and Inserting/Deleting elements from around the selected area.

Document Concepts and Terminology

This section explains the invention's concept of an intent-based editor. The invention looks at the document using two different conceptual models. It uses them all at the same time for different purposes. The models are logical and physical. In the logical model, the document is made up of a hierarchy of elements. Each element contains other elements and/or text. The innermost elements contain only characters. In the physical model, the document is made up of a series of pages, each of which contain text areas, which contain lines, which contain characters. The pages may also contain non-text areas. When a change is made to characters in the logical document, they must be formatted (positioned in the physical document).

Looks and Elements

An intent-based editor differs from other editors in the manner of user interaction. In an appearance-based editor, the user interacts directly with the physical model of the document by specifying look parameters.

The term "look parameter" is a primitive editing action. Examples of a look parameter are: increase the left margin by two centimeters; skip one inch of vertical space and begin the following text on a new line. The look parameters implemented are defined below. The term "look" is a set of values for each possible look parameter.

The user interacts with an intent-based editor on the logical level by specifying a look instead of individual look parameters. However the user does not specify looks directly. Instead, the user specifies elements, and the invention provides mapping of elements to looks.

The term "element" is a logical part of a document. Elements can contain other elements. The document, a headed section, a paragraph, and a bold phrase are all elements. (Each occurrence of an element is defined as an "element instance.") An element is a type of logical document part. There may be many lists in a document, but they are of the element type "list." (This definition is often more clearly termed an "element type.")

For example, in an appearance-based editor, the user might cause a line break, choose a particular font and margin setting, and flow the text. The user's intent was actually to create a paragraph. In the invention, these separate steps are combined; the user specifies an element of the type paragraph. The definition of element is consistent with SGML terminology. An element consists of a begin tag and its content. The content may include an end tag and may also include text and other elements.

The term "DTD" is the document type definition and defines the set of possible elements. It describes the characteristics associated with each element type, and which elements are valid within any given element.

Style

In order to interpret the user's intent, and translate logical element into physical looks, the invention requires three sets of rules known as style, inheritance, and defaults.

The term "style" is all information necessary to format a document. To format is to convert from the logical (intent) model of the document to the physical (appearance) model of the document.

The term "defaults" refers to a look parameter value for look parameters that cannot be inherited. Default values are used when the parameter is not specified in the defined element look or modified look for an element.

The term "inheritance" is the actual value of a look parameter which is set or modified by the value of a look for its parent element.

Before explaining how the invention uses style, inheritance, and defaults to interpret a user's intent, a few more definitions are needed. There are three terms used to qualify looks depending upon whether the look is for an element type or an element instance.

The term "DLOOK" is a defined look which is normally associated with an element type. Each DLOOK has a name, which is normally the same as the name of the element type (it can be overridden using a procedure).

The term "MLOOK" is a modified look which is associated with an element instance. It can specify a DLOOK to use and/or specify a set of look parameters.

The term "resolved look" is a look which has all parameters given specified values, there being no defaulted or inherited parameters.

Defined looks or DLOOKs contain look parameter values used by elements of the same type. For example, in a particular style, the paragraph element type may be mapped so that there is a line break, a vertical space of 0.1 inch is done, indentation of the first line is one-half inch, and all other look parameters are unspecified. Then for this example, the look parameter values listed above apply to all paragraphs in a document that use this style. This list of look parameter values is the defined look or DLOOK for the paragraph element type.

Normally the name of a DLOOK is the same as the element name, but some elements have multiple looks, and multiple elements can be mapped to the same look. For instance, the DLOOK for LI (list item) depends upon the type of list the list item is in, and the number of ancestors of this list item that are also lists of the same type.

Modified looks or MLOOKs contain only those look parameter values that apply to a particular element instance in a document. For example, an MLOOK on a particular paragraph in a document may define that paragraph to have a vertical space of 0.5 inch. This look parameter value applies only to that paragraph, and not to any other paragraph in the document.

Style information exists at three levels. The first one is "base style" which is a set of DLOOKs with a DLOOK for each element type. Each base style has a name. Base styles are supplied as input data to the system and are external to any document. The second one is "delta style" which is the set of DLOOKs contained within the document. The third one is "instance style" which is a set of MLOOKs contained within a particular document.

Note: The word "style" is used for base style, delta style, or instance style. The distinction may be understood by context. For example, whenever a reference is made to "the name of the style," what is meant is base style because only base styles have names. If a reference is made to "customizing a style," what is meant is delta style because customization refers to all elements in a document of the same element type. If a reference is made to "modifying a style," what is meant is instance style because modification refers to an element instance.

Inheritance rules allow a DLOOK and an MLOOK to be combined with a parent element's resolved look to form another resolved look for a child element. Inheritance rules state that for a particular look parameter one of the following apply:

1. The look parameter is interpreted as a relative value, so that the values in the two looks are merely added together. For example, if current left margin is one-half inch and the DLOOK for an extract says that the left margin is a delta of +one-half inch, then the combined look says that the extract has a left margin of one inch.

2. The look parameter is interpreted as an absolute value, so that the value in one look overrides the value in the other. For example, if the current typeface is Times Roman, and the MLOOK for a particular paragraph says that the typeface is Helvetica, then the look for that paragraph says that the typeface is Helvetica.

3. A look parameter may become meaningless because it is dominated by the value of another look parameter. For example, if the break look parameter says that there is no line break, then the space look parameter is meaningless.

Defaults allow a DLOOK to be reduced to a resolved look. A DLOOK leaves some look parameters unspecified. Defaults describe how the missing look parameters values are chosen. Either, 1. there is a default for the missing look parameter and the default value for that look parameter is used, or 2. there is no default and the element's parent is examined. The parent look gives that value to this element's look, as the child element.

It is now possible to describe how the invention interprets user intent. The following steps are performed for each element instance in a document:

1. If an MLOOK is defined in the instance style for that element instance, it is used to define the look. It may contain the name of the DLOOK to use, and its own look parameters.

2. If an MLOOK is not defined, use the DLOOK based on the element type.

3. The specified DLOOK is found in either the delta style, or the base style.

4. The MLOOK and DLOOK are combined with the parent look by the rules of inheritance to form the resolved look for this child element. (This may be recursive as it requires the parent look to be defined.)

The term "break" means where the line is to begin with reference to the termination of the previous document element. The term "space" refers to the vertical distance to space before the element.

A document construction module is a data set which characterizes the particular kind of document which the user intends to work with, for example research papers, or correspondence, or technical writing, or other distinctive document types. A document construction module can reside on a diskette which is loaded into the system, or alternately on a read only memory module which can be plugged into the system. The document construction module includes document type definition, base style, and on-line documentation and help panels which are unique to the particular form of document which the user intends to create or work with. A document construction module may contain several document type definitions and several corresponding sets of base styles, one for each respective document type definition.

Figure 2:
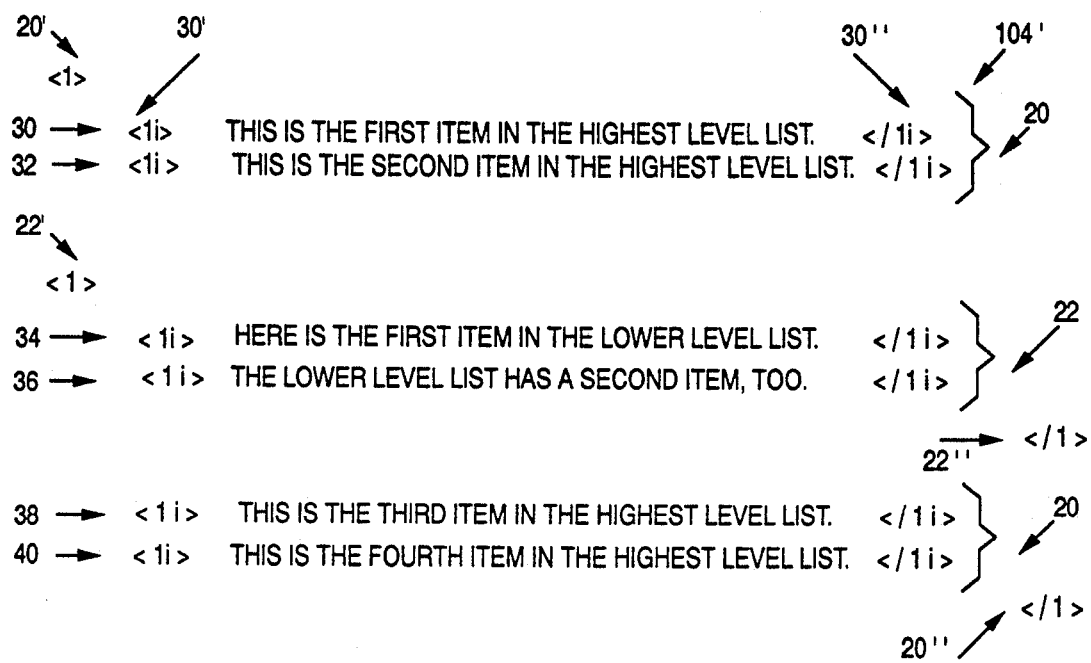
FIG. 2 is a first example of structured document tags for text 104 displayed in WYSIWYG form in FIG. 1.
Figure 3:
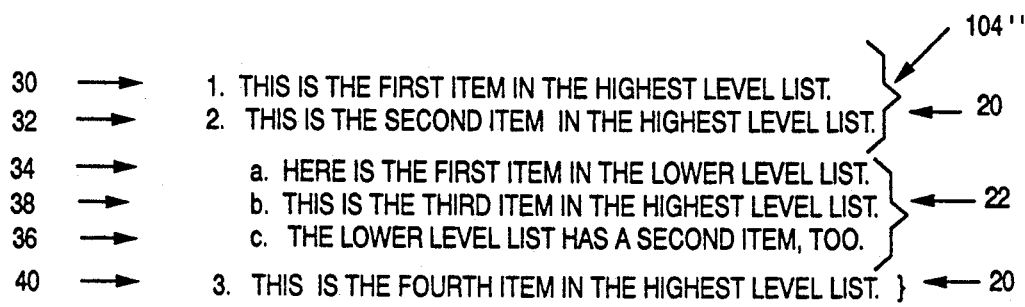
FIG. 3 is an example of inheriting a look for new parent structure, based upon the example shown in FIG. 2.

Turning now to FIG. 1, the overall system architecture of the invention is described. The system includes an all points addressable display 100 which is connected to the data processor 108, the memory 106, the printer 115 and the keyboard 114, and also the communications adapter 130. Displayed on the display 100 is a cursor 102 which is controlled by a cursor control 116 on the keyboard 114, and can be used to designate portions of the text 104 displayed. The text 104 which is displayed in FIG. 1 includes two ordered lists, the higher level list in the document hierarchy is list 20 which consists of lines 30, 32, 38 and 40. A lower level hierarchy list 22 is contained within the list 20 and is considered to be the child element of the parent element list 20. The child element list 22 consists of the lines 34 and 36. Reference to FIG. 2 will illustrate an example of the structured document tags for the text 104 displayed in FIG. 1. The structured document form is referred to as 104' for the text 104. The structured document 104' shown in FIG. 2 has the higher level list 20 designated by the begin tag 20' and the end tag 20''. The lower level list 22 is designated by the begin tag 22' and the end tag 22''. Line 30 in the higher level list 22 is designated by the list item begin tag 30' and end tag 30". Similarly for the lines 32, 34, 36, 38 and 40. FIG. 3 shows the result of moving line 38 in FIGS. 1 and 2 from the higher level list 20 to the lower level list 22. In the higher level list 20, ordered elements are given sequential Arabic numbers "1," "2," "3" and "4" as is shown in FIG. 1. The lower level list 22 assigns lowercase alphabetic sequential characters to the list items 34 and 36 as lowercase "a" and lowercase "b," respectively. The assignment of the leading Arabic number in the higher level list 20 is a look characteristic which is specifically associated with the higher level list 20. The assignment of sequential lowercase alphabetical characters to the list items in the lower level list 22 is a look characteristic specifically assigned to the lower level list 22. Another look characteristic which can be assigned to the higher level list is to have a zero left margin and a corresponding look characteristic assigned to the lower level list 22 is to have an indented left margin. In order to illustrate a desired result of the invention to be disclosed herein, it is to be noticed that the user of an editor who wishes to move a document element from the higher level list 20 to the lower level list 22 will naturally intend that when the moved element takes up its new location in the lower level list, that the moved element will take on the look characteristics of its companion elements in the lower level list. This is accomplished by the invention which will be disclosed herein and which is illustrated by the example in FIG. 3, wherein it is seen that line 38 which has been moved into the lower level list 22 takes on the look characteristics of the lines 34 and 36 already in the lower level list 22, namely that it is indented and that it is assigned a lowercase alphabetical leading character, in this case a lowercase "b." A related feature of such a block move is that the higher order list 20 will have its elements renumbered so that lines 30, 32 and 40 now have the leading character as "1," "2," and "3," respectively. Similarly, the lower level list 22 will have its elements 34, 38 and 36 reassigned lowercase alphabetical characters lowercase "a," lowercase "b" and lowercase "c," respectively. Thus, by referring to the text 104 displayed in FIG. 1 and its corresponding changed appearance 104" shown in FIG. 3, it can be seen that the invention to be disclosed herein accomplishes applying the intention of the user in attributing look characteristics to child document elements, depending upon the look characteristics of the parent element within which the child element is located.

Figure 19:
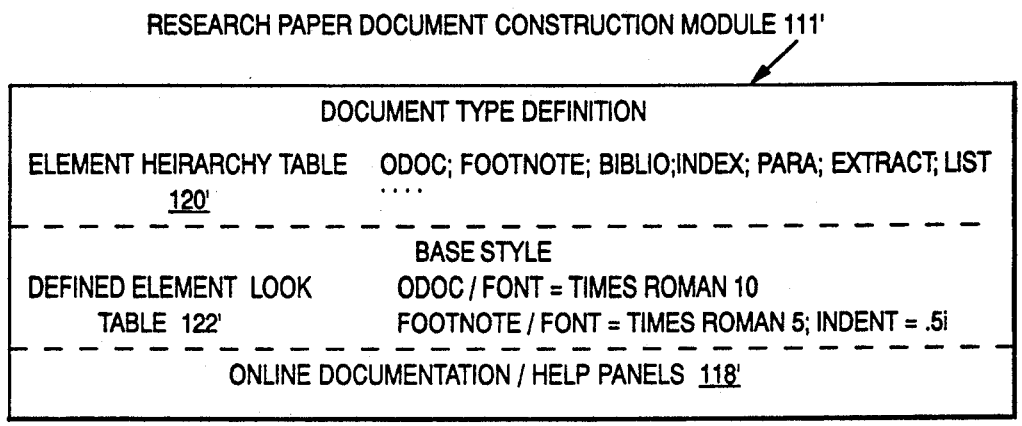
FIG. 19 illustrates the document construction module 111' for a research paper.
Figure 20:
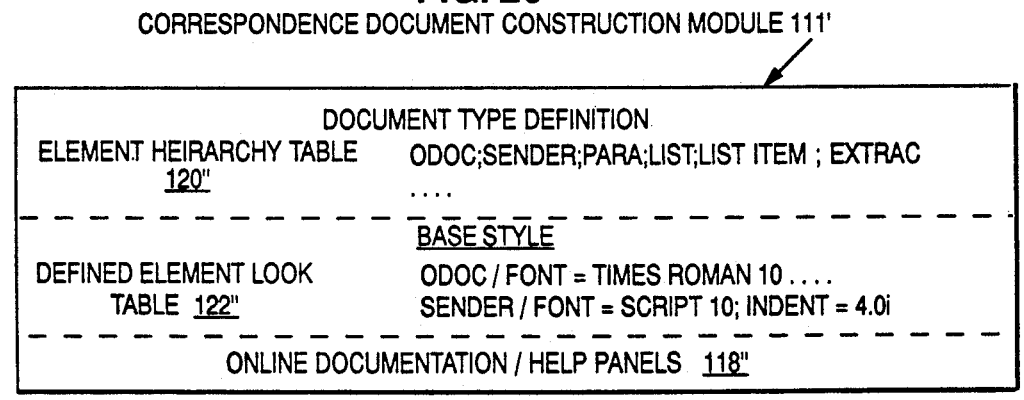
FIG. 20 illustrates the document construction module 111'' for correspondence.
Figure 21:
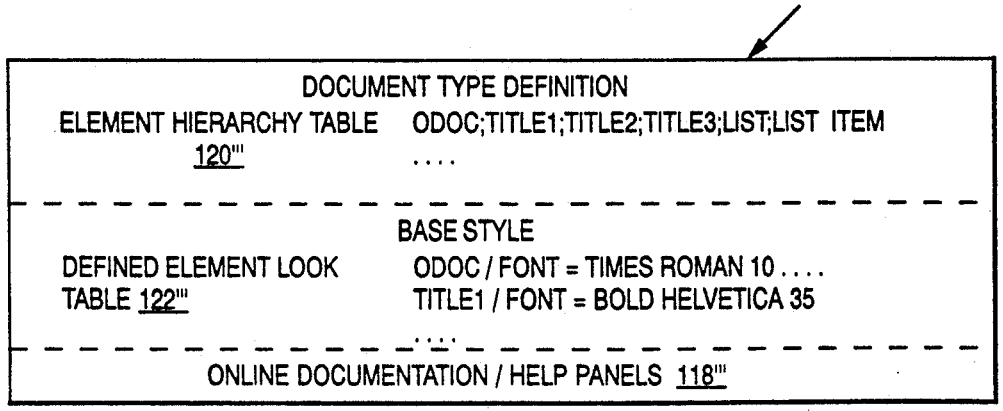
FIG. 21 illustrates the document construction module 111''' for technical writing.

Returning to FIG. 1, it is seen that the memory 106 of the system of FIG. 1 is partitioned into a number of portions which support the functions and operation of the invention. Program instructions 110 in FIG. 1 are the sequence of coded instructions which embody the flow diagrams shown in FIGS. 6A and 6B for the sequence of operational steps for carrying out the method of the invention. The partition 111 of the memory 106 is the location where the document construction module is stored. Three distinctive document construction modules 111', 111" and 111"' are shown in FIGS. 19, 20 and 21, respectively. The partition 112 of memory 106 is the structured document text which can be, for example, the structured text 104' shown in FIG. 2 which includes the structured document tags and the text.

The element hierarchy table 120 in memory 106 is shown in greater detail in FIG. 4, which specifies, for a particular structured document architecture, which document element types, when having the status of a child element, can reside inside another document element type which has the status of its immediate parent. For example, a list item can be the child of a list, which is indicated as a "1" value, whereas a list may not be the child of a list item, and this is indicated as a "0."

The defined element look table 122 in memory 106 is shown in greater detail in FIG. 5. Defined element looks are the DLOOK which was previously discussed. The collection of all of the looks specified in FIG. 5 would be a particular document base style. The ODOC element is the root element for all documents constructed with a particular document construction module. The look parameters for ODOC have the default values which can be applied to the parameters of other elements, when there is no corresponding value for the parameter provided by the defined looks for an element type, or by any modified looks for a particular instance of an element, and the parameter is a type for which a value may be inherited from a parent. The modified element look table 123 corresponds to the MLOOK, previously discussed. If the user wishes to specifically modify the look of any particular instance of an element in the document being constructed, the modified values for the corresponding look parameters will be stored in the table 123.

Figure 11:
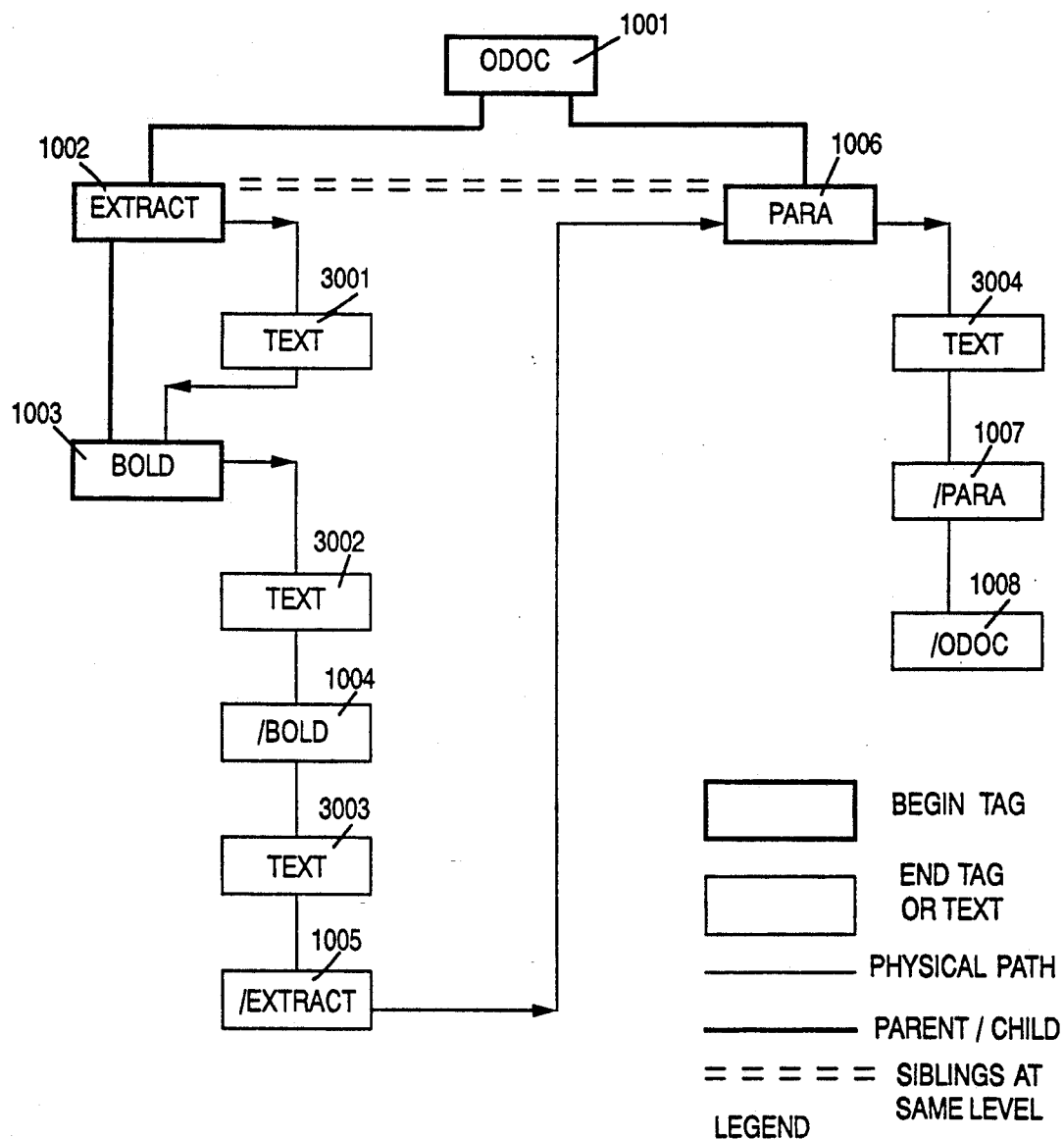
FIG. 11 illustrates schematically, the document structure for the text shown in FIG. 7, before a copy operation.

When the structured document text is read in and stored in the partition 112, it is processed by the program instructions 110 and in conjunction with the element hierarchy table 120, a structure for the particular document being edited by the user, is constructed and this is represented graphically by the illustration in the FIG. 11. The working example that will be used herein to illustrate the invention starts with FIG. 7 which shows a WYSIWYG depiction of text whose structured document tags and text are shown in FIG. 8. The beginning text shown in FIG. 7 has a first portion labeled 3001 which is a long quote which begins with the tag 1002 which is a "extract" begin tag and ends with tag 1005 which is a "/extract" end tag. As can be seen with reference to the WYSIWYG depiction in FIG. 7, embedded within the extract bounded by the tags 1002 and ending with 1005, is the bold face element 3002, which is bounded by the bold face tags 1003 and 1004. It is the intention of the user, as defined by the document construction module he has selected, that a long quote is to be italicized and this is specified by the defined look for the extract element. However it is further intended by the user that the embedded portion 3002 is especially important and therefore is to be further emphasized by inserting bold face tags, the bold face being imposed by the look for the bold element 1003. Additional features of the defined look for the extract are that it is indented on both its left and right sides, and also that it has a larger font size. A further section of the text which can be seen in the WYSIWYG depiction of FIG. 7 is the text portion 3004 which is designated by the tags 1006 and 1007 in FIG. 8. The hierarchical structure of the WYSIWYG text shown in FIG. 7 is graphically depicted in FIG. 11. In order to store a representation of this document structure in the memory 106, the document structure table 124 shown in FIG. 12 is stored in partition 124 of memory 106. The document structure table 124 of FIG. 12 is a data set which characterizes the structure illustrated in FIG. 11 and shown for the text in FIGS. 7 and 8. The data set in the document structure table 124 of FIG. 12 lists the memory address from 1001 through 1008 for the entries in table 124. It also has the parent address for each child element, the begin address corresponding to each end tag, a modified look pointer address, (if there is a modified value for a particular parameter), and a resolved look pointer address which will point to a resolved look shown in the resolved look table 126, to be described below. The document structure table 124 also includes a text pointer which points to a memory location in the string buffer 128 which is shown in FIG. 14 and will be further described below, and the document structure table 124 also includes for each entry, the next address in the document structure table 124 corresponding to the next sequential element or tag, the sequence being the physical sequence for display of the text.

The resolved look table 126 in the memory 106 is shown in greater detail in FIG. 13, before a copy operation, corresponding to the text of FIG. 7. The resolved look table 126, in accordance with the invention, specifies the modified look value for those look parameters whose values have been customized by the user for specific portions of the text, those modified element look values being accessed from table 123. Other parameter values in the resolved look table 126 are taken from the defined element look table 122 for those looks which are to have a standard appearance for the child element.

Still other values for the look parameters in the resolved look table 126 which are not customized by the user and which have not been defined as standard values for the child element, can be inherited by the child element from the parent element. In accordance with the invention, the method performs the step of augmenting the child resolved look data set in table 126 by accessing one or more of the look values in the parent resolved look data set in table 126. The resulting full complement of look values in the resolved look table 126 can completely specify the appearance of the child portion of the text when displayed in WYSIWYG form on a display or when printed in hard copy.

The working example begins with the WYSIWYG text shown in FIG. 7 and ends with the WYSIWYG text shown in FIG. 9, where a copy operation has been performed on the bold face emphasized text 3002 in FIG. 7 so that the bold face text is copied from the italicized extract bounded by tags 1002 and 1005, that bold face text being copied into the middle of the paragraph defined by the paragraph begin tag 1006 and paragraph end tag 1007. It would be the natural intention of the user performing the editing operation, that when copying the bold face text from the italicized portion of the document and inserting the copy of bold face text into a non-italicized portion of the document, that the italicized characteristic of the text be removed from the copied over portion inserted in the non-italicized portion of the document. This indeed is the result of the operation of the invention.

Figure 6A:
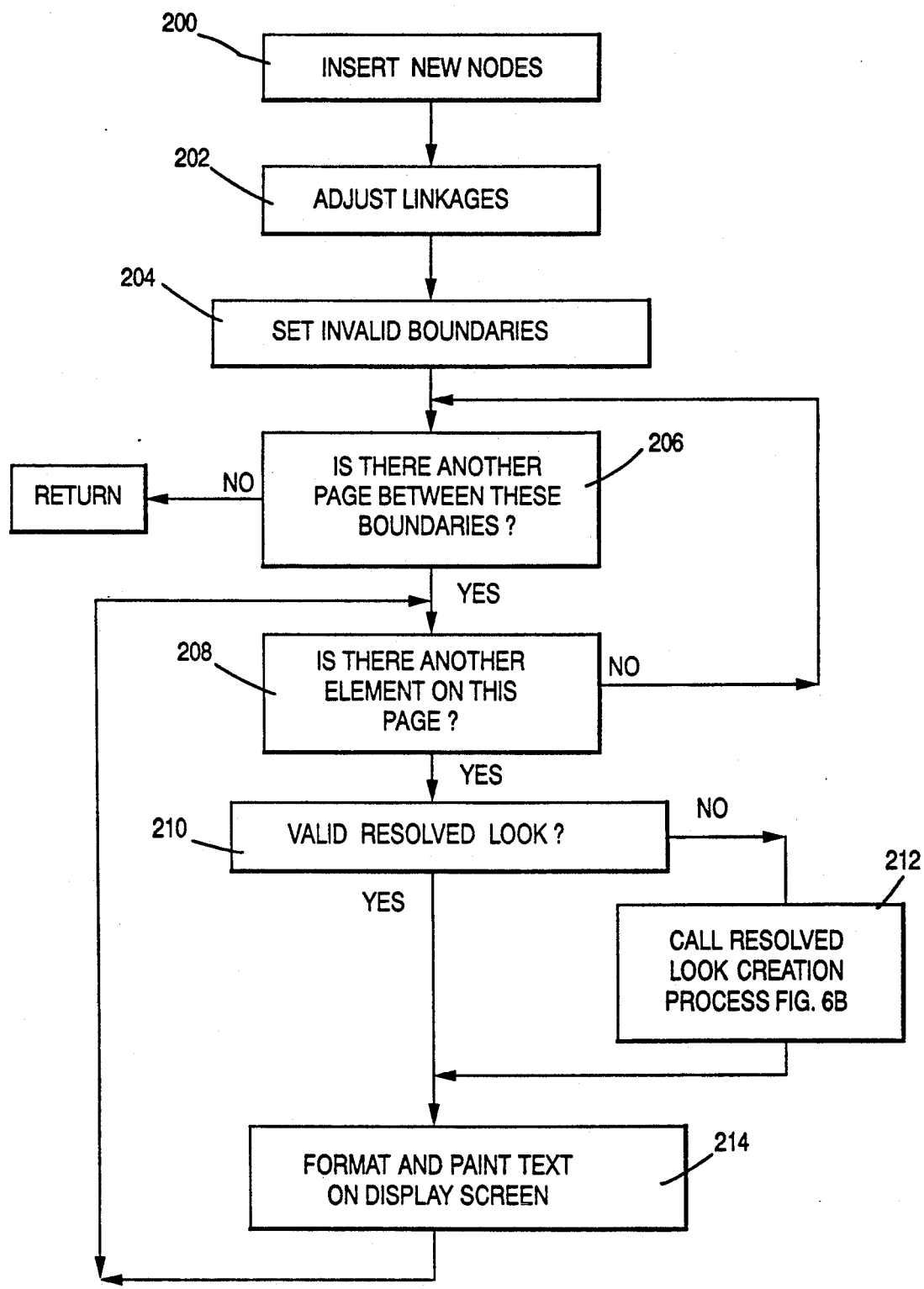
FIG. 6A is a flow diagram which shows the process of copying or moving a document element.
Figure 6B:
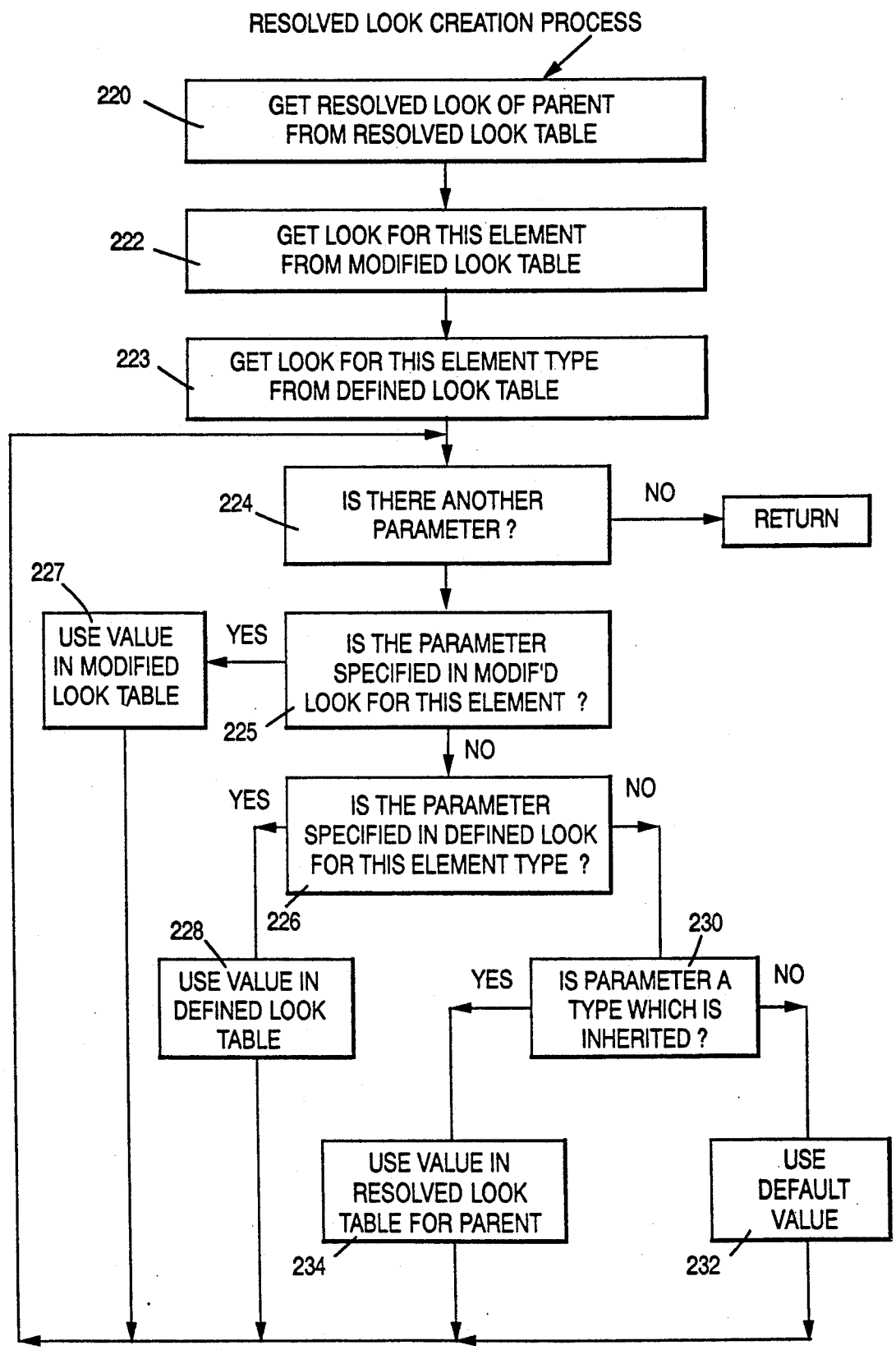
FIG. 6B is a flow diagram which is called by step 212 of the flow diagram of FIG. 6A, and provides the resolved look creation process.
Figure 15:
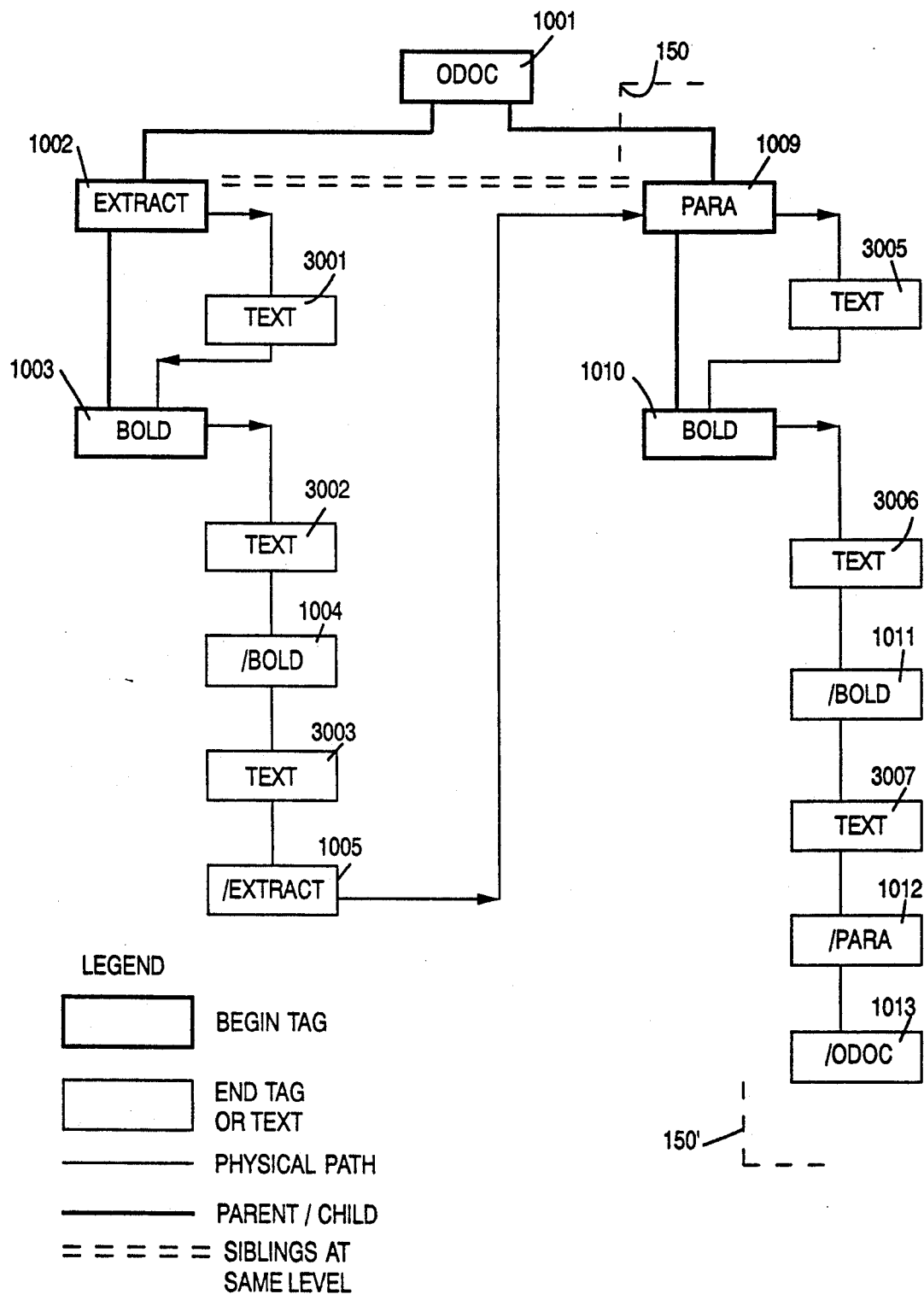
FIG. 15 schematically illustrates the document structure after the copy operation, for the text shown in FIG. 9.

FIGS. 6A and 6B illustrate the sequence of operational steps which will carry out the method of the invention. These steps are applied to the operation of copying the bold face text 3002 from the extract portion defined by tags 1002 and 1005, to the paragraph portion of the document defined by the paragraph tags 1006 and 1007. In FIG. 6A, the process can start at step 200 by inserting the new nodes, as is depicted by the logical and physical organization of the finished text as shown in FIG. 15. In step 202, the linkages are adjusted, and this step can be seen in the transition from the document structure table 124 of FIG. 12 before copy operation, to the table 124 in FIG. 16 after the copy operation, where the next addresses, parent addresses, begin addresses and text pointers are established. Next, step 204 sets invalid boundaries and that is identified as the boundaries 150 and 150' which designate the portion of the structure in FIG. 15 which must have the resolved look table 126 reevaluated.

Then, in step 206, it is determined whether there is another page between these boundaries and if there is, then the flow transitions to step 208 to determine if there is another element on this page. If there is, then the flow transitions to step 210 to determine if a valid resolved look is present. In the step 202 of adjusting the linkages, some of those document elements, such as the new bold element at address 1010, that reside within the boundaries 150 to 150' may not have a resolved look pointer value in their corresponding table of FIG. 16. Thus each of those elements will be considered to not have a valid resolved look and therefore step 210 will transition to step 212 which calls the resolved look creation process of FIG. 6B.

In FIG. 6B, the resolved look creation process begins with step 220 which gets the resolved look of the parent element from the resolved look table 126. Then step 222 gets the modified look, if one has been specified, for this element, from the modified look table 123. In this working example, there are no modified looks. Then in step 223, the defined look for this element type is accessed from the defined look table 122. Then the flow of FIG. 6B transitions to step 224 which starts the loop to determine if there is another parameter. If yes, then step 225 determines if there is a value for this parameter specified in the modified look for this element. In this working example there is none, however if there were, then step 227 would use the value in the modified look table. However, since there is none for this working example, the flow transitions to step 226 which asks is the parameter specified in the defined look table for this element type. If yes then step 228 uses the value in the defined look table. However, if the parameter is not specified in the defined look for this element type, then the flow transitions to step 230. In step 230, a determination is made as to whether this parameter is a type which is inherited. It can be seen in FIG. 17 that this information can be included in the resolved look table 126 or it can be included elsewhere in the memory 106. If this is a parameter type which can be inherited, then the flow transitions to step 234 which uses the value in the resolved look table for the parent. For example, referring to FIG. 16, the bold text 3006 copied into the non-italicized portion defined by the paragraph begin tag 1009 and the paragraph end tag 1012. The bold begin tag 1010 has its parent address 1009 referring to the paragraph tag 1009. The paragraph tag 1009 has its resolved look pointer pointing to the address 2004, which can be seen in FIG. 17 as identifying the resolved look for the parent paragraph. The italics parameter for the paragraph 2004 is designated as "N" which means there will be no italics in the paragraph 2004. This italics parameter for the child element which is the bold element 1010, has its corresponding resolved look table at address 2005 in FIG. 17, inheriting the value "N" from the italics parameter value in the paragraph resolved look table at address 2004. It is seen that the defined look which was determined in step 226 for the child bold face element 1010, is "bold face" as is specified in the defined element look table 122. Thus it is seen that the values of the look parameters for the resolved look table corresponding to the newly copied bold section 1010 are a combination of the defined look for the child element type "bold" defined in table 122, and the inherited look from the parent paragraph resolved look table at address 2004 for the italics ("N"), there being no italics intended by the user.

The process of FIGS. 6A and 6B then continues by completing the resolved look table 126 for any elements having an invalid resolved look within the invalid boundaries 150-150'. The process then transitions to step 214 in FIG. 6A, where the resultant WYSIWYG text is formatted and displayed on the display screen of the display 100. Optionally, the WYSIWYG text can also be printed on the printer 115, if a hard copy is desired. Additionally, the resultant text can be communicated over a transcontinental satellite communications link via the communications adapter 130 to other data processing systems.

FIGS. 19, 20 and 21 show three different document construction modules 111', 111" and 111''', for diverse types of documents. The user will express his intention for preparing a particular type of document, by selecting a particular type of document construction module. The document construction module for a research paper in FIG. 19, for example, will include provision for document elements characteristic of research papers, such as footnotes, bibliographies, and index portions. The document type definition for the document construction module 111' will specify defined look values for parameters for such elements as the footnotes, where the font will be specified as a smaller font than the default font specified for ODOC. A specific left-hand margin indention will also be specified for the footnote element. The document type definition will include a particular element hierarchy table 120' corresponding to the particular document elements characterizing research paper formats. The base style for the research paper type documents will be defined by the defined element look table 122' in the document construction module 111'. To the extent that there are unique help panels and on-line documentation 118' associated with preparing a research paper, they will also be included in the document construction module 111'. FIG. 20 shows distinctive document type definition and base style for correspondence in the document construction module 111''. Note that an element "sender" is provided for correspondence type documents which has no counterpart for research paper type documents. The sender element will have a corresponding defined look specified in the base style with a script font and an indentation of four inches, corresponding to a signature location at the end of correspondence. FIG. 21 illustrates still other elements in the document type definition for technical writing, for the module 111'''.

FIG. 22 illustrates an overall flow diagram for the sequence of operational steps to carry out the invention. The user will begin an editing session by loading program instructions 110 in the step 250. The user will then indicate his intention to prepare a particular type of document by selecting an appropriate document construction module 111 in step 252. The user's intention in preparing a research paper with its associated document type definition and base style, is reflected by his selection of the document construction module 111'. Alternately, the user will reflect a different intention to prepare correspondence with its different format, by selecting the document construction module 111''. Alternately, the user will indicate his further distinctive intention to prepare technical writing by selecting the document construction module 111'''. The step of selecting a particular document construction module in step 252 provides an indication of the user's intention that the set of defined looks corresponding to the base style for the particular type of document, are to be implemented in constructing the WYSIWYG appearance of the document.

The flow diagram of FIG. 22 then transitions to step 254 which constructs the element hierarchy table 120 from the document construction module 111. This is an optional step, since the document construction module 111 in memory 106 may have its various tables directly addressed to provide the element hierarchy table 120. Similarly, in step 256, the defined element look table 122 is constructed from the document construction module 111. This is also an optional step, since the document construction module 111 in the memory partition of memory 106, can have its tables directly addressed to provide the defined element look table 122.

The step 258 of FIG. 22 then inputs the structured document text 112. This input step may be by loading a preexisting file in the disk drive 117 or by receiving a preexisting file over the communications link and communications adapter 130, or alternately by the user generating the alphanumeric text on the keyboard 114. Next, step 260 asks whether the user selects any instance of an element to have its look modified. If yes, then in step 262, the user selects the document element instances for look modification and the modified element look table 123 is constructed. The flow diagram of FIG. 22 then transitions to step 264 where further steps are carried out to edit the document, as are reflected in FIG. 6A. A variety of editing steps can take place. The editing steps of FIG. 6A pertain to the addition or insertion of new nodes to the document structure, as has been previously discussed. The flow diagram of FIG. 22 then transitions to step 266 where the resolved look table 126 is constructed, in accordance with FIG. 6B. These steps have been previously discussed. The flow diagram of FIG. 22 then transitions to step 268 where it is determined whether there are any more elements to edit. If there are, then editing continues. If there are not, then the flow diagram transitions to step 270 where it is determined whether the user wishes to print the edited document. If so, step 272 outputs the edited text to the printer 115 for printing a hard copy, and then the flow diagram transitions to step 278 to return to the main program. Alternately, if no hard copy is desired, the flow diagram transitions to step 274 where it is determined whether the user wishes to transmit a copy of the edited document. If yes, then in step 276, the edited document file is output to the communications adapter 130 and the communications link for transmission to other data processors either located locally or remotely from the data processor of FIG. 1. Afterward, the flow diagram transitions to step 278 to return to the main program.

FIG. 23 illustrates the flow diagram of the sequence of operational steps to print a document using the look parameter values from the resolved look table 126 for each respective element to be printed. The flow diagram of FIG. 23 starts with step 280 which determines if there is another page to print. If yes, then the flow transitions to step 282 where it is determined if there is another element to print on this page. If this is true, then the flow transitions to step 284 where the document structure table 124 is entered at the address of the element to be printed. The flow diagram then transitions to step 286 to get the text pointer value from the document structure table 124 corresponding to the address of the element. The flow then transitions to step 288 to access the text string from the string buffer 128 at the text pointer value. The flow then transitions to step 290 to get the resolved look pointer value from the document structure table 124 corresponding to the address of the element. The flow then transitions to step 292 to access the look parameter values from the resolved look table 126 at the resolved look pointer value. The flow then transitions to step 294 where the look parameter values are used to generate control signals applied to the printer 115 and the text string is output to the printer 115, enabling the printing of the text string by the printer 115 so as to have the WYSIWYG appearance intended by the user. The flow then transitions to step 282 to determine if there is another element to print on this page. If there is, then the process continues as previously described. If not, then the flow transitions to step 280 to determine if there is another page to print. If there is not, then the flow transitions to step 296 to return to the main program. The printer 115 can be a suitable printer which can be controlled by signals corresponding to the look parameter values, such as an all points addressable laser printer, all points addressable ink jet printer, all points addressable dot matrix printer, or other suitable hard copy printing device.

The resulting system and method for editing a structured document preserves the intended appearance of the document elements, as the user has indicated in his selection of a particular document construction module. As a result, the WYSIWYG appearance of edited documents processed by the invention effectively preserves the intended appearance. The invention provides a greater flexibility and control in designating the appearance of document elements, than has been previously available.

Although a specific embodiment of the invention has been disclosed, it will be understood by those having skill in the art that changes can be made to that specific embodiment without departing from the spirit and the scope of the invention.

What is claimed is:

1. In a data processing system for editing a text document stored as at least one alphanumeric string of structured document text and displayed as WYSIWYG (What You See Is What You Get) text, a method for controlling look characteristics of a child element of the text located within a parent element of the text, comprising the steps of:

storing a defined look value for a first look parameter necessary to specify a WYSIWYG appearance of said child element, wherein said child element has a first level in a structured document hierarchy;

storing a parent resolved look data set having a plurality of look values for a plurality of look parameters necessary to specify a WYSIWYG appearance of said parent element, wherein said parent element has a second level higher than said first level in said structured document hierarchy;

constructing a child resolved look data set by accessing said defined look value for said first look parameter;

augmenting said child resolved look data set by accessing at least one of said plurality of look values in said parent resolved look data set which does not correspond to said first look parameter;

displaying a WYSIWYG appearance of said child element controlled by a combination of defined look values for said child element and inherited look values for said parent element.

2. In a data processing system for editing a text document stored as at least one alphanumeric string of structured document text and displayed as WYSIWYG text, a method for controlling look characteristics of a child element of the text located within a parent element of the text, comprising the steps of:

storing a modified look value for a first look parameter necessary to specify a WYSIWYG appearance of said child element, wherein said child element has a first level in a structured document hierarchy;

storing a defined look value for a second look parameter necessary to specify a WYSIWYG appearance of said child element;

storing a parent resolved look data set having a plurality of look values for a plurality of look parameters necessary to specify a WYSIWYG appearance of said parent element, wherein said parent element has a second level higher than said first level in said structured document hierarchy;

constructing a child resoled look data set by accessing said modified look value for said first look parameter and accessing said defined look value for said second look parameter;

augmenting said child resolved look data set by accessing at least one of said plurality of look values in said parent resolved look data set which does not correspond to said first or said second look parameters;

displaying a WYSIWYG appearance of said child element controlled by a combination of modified and defined look values for said child element and inherited look values for said parent element.

3. In a data processing system for editing a text document stored as at least one alphanumeric string of structured document text and displayed as WYSIWYG text, a method for controlling look characteristics of a child element of the text located within a parent element of the text, comprising the steps of:

storing defined look values for at least a subplurality of a first plurality look parameters sufficient to specify a WYSIWYG appearance of said child element, wherein said child element has a first level in a structured document hierarchy;

constructing a document structure data set logically relating said child element to said parent element;

storing a parent resolved look data set having a plurality of look values for said first plurality of look parameters necessary to specify a WYSIWYG appearance of said parent element, wherein said parent element has a second level higher than said first level in said structured document hierarchy;

constructing a child resolved look data set by accessing said defined look values for said subplurality of look parameters;

augmenting said child resolved look data set by accessing at least one of said plurality of look values in said parent resolved look data set which does not correspond to said subplurality of look parameters;

displaying a WYSIWYG appearance of said child element controlled by a combination of defined look values for said child element and inherited look values for said parent element.

4. In a data processing system for editing a text document stored as at least one alphanumeric string of structured document text and displayed as WYSIWYG text, a method for controlling look characteristics of a child element of the text located within a parent element of the text, comprising the steps of:

storing modified look values for at least a first subplurality of a first plurality look parameters sufficient to specify a WYSIWYG appearance of said child element, wherein said child element has a first level in a structured document hierarchy;

storing defined look values for at least a second subplurality of said first plurality look parameters sufficient to specify a WYSIWYG appearance of said child element;

constructing a document structure data set logically relating said child element to said parent element;

storing a parent resolved look data set having a plurality of look values for said first plurality of look parameters necessary to specify a WYSIWYG appearance of said parent element, wherein said parent element has a second level higher than said first level in said structured document hierarchy;

constructing a child resolved look data set by accessing said modified look values for said first subplurality of look parameters;

augmenting said child resolved look data set by accessing said defined look values for said second subplurality of look parameters;

augmenting said child resolved data set by accessing at least one of said plurality of look values in said parent resolved look data set which does not correspond to said first subplurality or second subplurality of look parameters;

displaying a WYSIWYG appearance of said child element controlled by a combination of modified and defined look values for said child element and inherited look values for said parent element.

5. In a data processing system for editing a text document stored as at least one alphanumeric string of structured document text and displayed as WYSIWYG text, a method for controlling look characteristics of a child element of the text located within a parent element of the text, comprising the steps of:

storing a document construction data set defining a document type and base style intended for an appearance of a document, including storing a defined look value for a first look parameter necessary to specify a WYSIWYG appearance of said child element, wherein said child element has a first level in a structured document hierarchy;

storing a parent resolved look data set having a plurality of look values for a plurality of look parameters necessary to specify a WYSIWYG appearance of said parent element, wherein said parent element has a second level higher than said first level in said structured document hierarchy;

constructing a child resolved look data set by accessing said defined look value for said first look parameter;

augmenting said child resolved look data set by accessing at least one of said plurality of look values in said parent resolved look data set which does not correspond to said first look parameter;

displaying a WYSIWYG appearance of said child element controlled by a combination of defined look values for said child element and inherited look values for said parent element.

6. The method of claim 5, which further comprises the step of:

selectively printing said text document with a WYSIWYG appearance of said child element controlled by a combination of defined look values for said child element and inherited look values for said parent element.

7. The method of claim 5, which further comprises the step of:

selectively transmitting said text document over a communications link to a remote data processing system, where said child element can be displayed with a WYSIWYG appearance which can be specified by a combination of defined look values for said child element and inherited look values for said parent element.

8. In a data processing system for editing a text document stored as at least one alphanumeric string of structured document text and displayed as WYSIWYG text, a method for controlling look characteristics of a child element of the text located within a parent element of the text, comprising the steps of:

storing a document construction data set defining a document type and base style intended for an appearance of a document;

storing a modified look value for a first look parameter necessary to specify a WYSIWYG appearance of said child element, wherein said child element has a first level in a structured document hierarchy;

said document construction data set including a defined look value for a second look parameter necessary to specify a WYSIWYG appearance of said child element;

storing a parent resolved look data set having a plurality of look values for a plurality of look parameters necessary to specify a WYSIWYG appearance of said parent element, wherein said parent element has a second level higher than said first level in said structured document hierarchy;

constructing a child resolved look data set by accessing said modified look value for said first look parameter and accessing said defined look value for said second look parameter;

augmenting said child resolved look data set by accessing at least one of said plurality of look values in said parent resolved look data set which does not correspond to said first or said second look parameters;

displaying a WYSIWYG appearance of said child element controlled by a combination of modified and defined look values for said child element and inherited look values for said parent element.

9. The method of claim 8, which further comprises the step of:

selectively printing said text document with a WYSIWYG appearance of said child element controlled by a combination of defined look values for said child element and inherited look values for said parent element.

10. The method of claim 9, which further comprises the step of:

selectively transmitting said text document over a communications link to a remote data processing system, where said child element can be displayed with a WYSIWYG appearance which can be specified by a combination of defined look values for said child element and inherited look values for said parent element.

11. In a data processing system for editing a text document stored as at least one alphanumeric string of structured document text and displayed as WYSIWYG text, an apparatus for controlling look characteristics of a child element of the text located within a parent element of the text, comprising:

a memory for storing a document construction data set defining a document type and base style intended for an appearance of a document, including a memory partition for storing a defined look value for a first look parameter necessary to specify a WYSIWYG appearance of said child element, wherein said child element has a first level in a structured document hierarchy;

said memory storing a parent resolved look data set having a plurality of look values for a plurality of look parameters necessary to specify a WYSIWYG appearance of said parent element, wherein said parent element has a second level higher than said first level in said structured document hierarchy;

a processor coupled to said memory for constructing a child resolved look data set by accessing said defined look value for said first look parameter;

said processor augmenting said child resolved look data set by accessing at least one of said plurality of look values in said parent resolved look data set which does not correspond to said first look parameter;

a display means coupled to said processor for displaying a WYSIWYG appearance of said child element controlled by a combination of defined look values for said child element and inherited look values for said parent element.

12. The apparatus of claim 11, which further comprises:

a printer coupled to said processor for selectively printing said text document with a WYSIWYG appearance of said child element controlled by a combination of defined look values for said child element and inherited look values for said parent element.

13. The apparatus of claim 11, which further comprises:

a communications means coupled to said processor for selectively transmitting said text document over a communications link to a remote data processing system, where said child element can be displayed with a WYSIWYG appearance which can be specified by a combination of defined look values for said child element and inherited look values for said parent element.

14. In a data processing system for editing a text document stored as at least one alphanumeric string of structured document text and displayed as WYSIWYG text, an apparatus for controlling look characteristics of a child element of the text located within a parent element of the text, comprising:

a memory for storing a document construction data set defining a document type and base style intended for an appearance of a document;

said memory storing a modified look value for a first look parameter necessary to specify a WYSIWYG appearance of said child element, wherein said child element has a first level in a structured document hierarchy;

said document construction data set including a defined look value for a second look parameter necessary to specify a WYSIWYG appearance of said child element;

said memory storing a parent resolved look data set having a plurality of look values for a plurality of look parameters necessary to specify a WYSIWYG appearance of said parent element, wherein said parent element has a second level higher than said first level in said structured document hierarchy;

a processor coupled to said memory for constructing a child resolved look data set by accessing said modified look value for said first look parameter and accessing said defined look value for said second look parameter;

said processor augmenting said child resolved look data set by accessing at least one of said plurality of look values in said parent resolved look data set which does not correspond to said first or said second look parameters;

a display means coupled to said processor for displaying a WYSIWYG appearance of said child element controlled by a combination of modified and defined look values for said child element and inherited look values for said parent element.

15. The apparatus of claim 14, which further comprises:

a printer coupled to said processor for selectively printing said text document with a WYSIWYG appearance of said child element controlled by a combination of defined look values for said child element and inherited look values for said parent element.

16. The apparatus of claim 14, which further comprises:

a communications means coupled to said processor for selectively transmitting said text document over a communications link to a remote data processing system, where said child element can be displayed with a WYSIWYG appearance which can be specified by a combination of defined look values for said child element and inherited look values for said parent element.

* * * * *